(12) United States Patent
Jiang et al.

(10) Patent No.: US 11,415,322 B2
(45) Date of Patent: Aug. 16, 2022

(54) GAS STOVE TEMPERATURE-CONTROL SYSTEM, GAS STOVE WITH THE SAME AND METHOD FOR CONTROLLING TEMPERATURE OF GAS STOVE

(71) Applicant: Zhejiang Fudeer Electric Appliance Co., Ltd., Zhejiang (CN)

(72) Inventors: Junhua Jiang, Zhejiang (CN); Meide Jiang, Zhejiang (CN)

(73) Assignee: Zhejiang Fudeer Electric Appliance Co., Ltd., Taizhou (CN)

( * ) Notice: Subject to any disclaimer, the term of this patent is extended or adjusted under 35 U.S.C. 154(b) by 71 days.

(21) Appl. No.: 16/952,037

(22) Filed: Nov. 18, 2020

(65) Prior Publication Data

US 2022/0113032 A1 Apr. 14, 2022

(30) Foreign Application Priority Data

Oct. 13, 2020 (CN) .......................... 202011088482.2

(51) Int. Cl.
| | |
|---|---|
| *F24C 3/12* | (2006.01) |
| *F23N 1/00* | (2006.01) |
| *F24C 3/10* | (2006.01) |
| *F24C 15/10* | (2006.01) |
| *F24C 15/16* | (2006.01) |

(52) U.S. Cl.
CPC .............. *F24C 3/124* (2013.01); *F23N 1/005* (2013.01); *F24C 3/103* (2013.01); *F24C 15/107* (2013.01); *F24C 15/16* (2013.01)

(58) Field of Classification Search
CPC ....... A23B 4/052; A23B 4/0523; F23N 1/005; F24C 15/107; F24C 15/16; F24C 3/106; F24C 3/124
USPC .......................... 99/482; 126/25 R, 29, 39 G
See application file for complete search history.

(56) References Cited

U.S. PATENT DOCUMENTS

| | | | |
|---|---|---|---|
| 2007/0204858 A1* | 9/2007 | Abelbeck .................. | F24C 3/12 126/41 R |
| 2011/0168158 A1* | 7/2011 | Barkhouse .............. | A47J 36/06 126/25 R |
| 2013/0199512 A1* | 8/2013 | Cetintas .................. | F24C 3/128 126/39 BA |
| 2014/0216436 A1* | 8/2014 | George ............... | A47J 37/0786 126/25 R |
| 2020/0093330 A1 | 3/2020 | Dahle et al. | |

FOREIGN PATENT DOCUMENTS

| | | |
|---|---|---|
| CN | 101000147 A | 7/2007 |
| CN | 104011467 A | 8/2014 |
| CN | 205338700 U | 6/2016 |

(Continued)

*Primary Examiner* — Vivek K Shirsat

(57) ABSTRACT

This application provides a gas stove temperature-control system, the gas stove with the same and a method for controlling temperature of the gas stove. The gas stove temperature-control system including a power board and a rechargeable battery supplying power to the power board further includes: a stove cover limit switch connected to the power board; a gas valve connected to the power board; an electromagnetic valve connected to the power board and the gas valve; an ignition pin connected to the power board; a burner connected to the gas valve and the ignition pin; and a thermocouple connected to the power board.

5 Claims, 6 Drawing Sheets

(56) References Cited

FOREIGN PATENT DOCUMENTS

| | | |
|---|---|---|
| CN | 107388298 A | 11/2017 |
| CN | 207230631 U | 4/2018 |
| CN | 108592647 A | 9/2018 |
| CN | 210399013 U | 4/2020 |

* cited by examiner

GAS STOVE TEMPERATURE-CONTROL SYSTEM, GAS STOVE WITH THE SAME AND METHOD FOR CONTROLLING TEMPERATURE OF GAS STOVE

CROSS-REFERENCE TO RELATED APPLICATION

The present application claims the priority benefit of China application serial No. 202011088482.2 filed on Oct. 13, 2020. The entirety of the above-mentioned patent application is incorporated herein by reference and made a part of this specification.

BACKGROUND

Technical Field

This application relates to a field of a gas stove, and more particularly, to a method for controlling temperature of the gas stove and the gas stove.

Description of Related Art

Food is generally grilled on a gill of a gas stove by ignition of gas. The gas stove is provided with a burner under the grill which is connected with an external gas source via a gas tube passing through a side wall of the gas stove. The food in the gas stove is grilled by igniting the burner.

In view of the above-mentioned related technologies, the inventor believes that in the process of igniting the gas by the burner and supplying the gas, the temperature inside the gas stove needs to reach combustion temperature of the gas for successful ignition. In this process, if the gas is supplied too much while the temperature inside the gas stove does not reach the combustion temperature of the gas, an explosion may be easily caused due to the increase of the ratio of the gas to air in the stove, imposing a serious hidden danger.

SUMMARY

With a view of improving the safety of a gas stove, this application provides a gas stove temperature-control system, the gas stove with the same and a method for controlling temperature of the gas stove.

In a first aspect, this application provides a gas stove temperature-control system adopting the following technical solution.

A gas stove temperature-control system includes a power board and a rechargeable battery supplying power to the power board, further includes:

a stove cover limit switch connected to the power board and configured to determine whether a stove cover is open or closed;

a gas valve connected to the power board and configured to control on/off of gas and adjust flow rate thereof;

an electromagnetic valve connected to the power board and the gas valve and used to control turn-on and turn-off of the gas valve;

an ignition pin connected to the power board and configured for ignition in the stove;

a burner connected to the gas valve and the ignition pin, and ignited by the ignition pin using the gas input via the gas valve; and a thermocouple connected to the power board and configured to detect whether the burner is burning.

In some embodiments, when the stove cover limit switch is turned on to close the stove cover, a thermoelectric potential difference inside the stove is detected by the thermocouple. If the thermoelectric potential difference is lower than a preset target value, meaning that the burner does not work, the electromagnetic valve is turned off, so that the gas is not passed into the gas valve. If the thermoelectric potential difference is greater than or equal to the preset target value, meaning that the burner is burning, it is checked whether the electromagnetic valve is energized. When the electromagnetic valve is energized, the gas is passed into the gas valve, and a user is informed that the burner is ignited. When the electromagnetic valve is turned off, the gas is not passed into the gas valve, meaning that the burner has just been turned off and the thermocouple has not yet been cooled down and the user is informed to open the stove cover for re-ignition.

Optionally, the gas stove temperature-control system further includes:

a stove-temperature sensor connected to the power board and configured to detect temperature inside the gas stove; and a control/display panel connected to the power board and configured to set grilling temperature and grilling time and real-time display change in temperature inside the gas stove.

In some embodiments, when the stove cover limit switch is turned off to open the stove cover, a thermoelectric potential difference inside the stove is detected by the thermocouple. If the thermoelectric potential difference is lower than the preset target value, meaning that the burner does not work, the grilling temperature is set on the control/display panel, the electromagnetic valve is energized and the gas is passed into the gas valve. If the thermoelectric potential difference is greater than or equal to the preset target value, meaning that the burner is burning, it is checked whether the electromagnetic valve is energized. When the electromagnetic valve is energized, the gas is passed into the gas valve, and the user is informed that the burner is ignited. When the electromagnetic valve is turned off, the gas is not passed into the gas valve, and the user is informed that the burner has just been turned off and the thermocouple has not yet been cooled down.

Optionally, the gas stove temperature-control system further includes:

a stepping motor connected to the gas valve and the power board and configured to adjust an angle at which the gas valve supplies the gas into the stove so as to control amount of the gas supplied into the stove;

wherein a full-angle gas-in temperature threshold lower than the set grilling temperature is preset on the control/display panel and the stepping motor is preset with a minimum gas-in angle.

In some embodiments, when the stove cover limit switch is turned off to close the stove cover, the thermoelectric potential difference inside the stove is detected by the thermocouple. When the thermoelectric potential difference is greater than or equal to the preset target value and the temperature inside the stove is lower than the full-angle gas-in temperature threshold, the stepping motor controls the gas valve to supply the gas at the full-angle; when the temperature inside the stove detected by the stove-temperature sensor is greater than or equal to the full-angle gas-in temperature threshold and gradually increased, the stepping motor controls the gas valve to supply the gas at decreased angle; and when the temperature inside the stove detected by the stove-temperature sensor is greater than or equal to the set grilling temperature, the stepping motor controls the gas valve to supply the gas at the minimum gas-in angle.

Optionally, the gas stove temperature-control system further includes a mobile terminal connected to the control/display panel and configured to remotely set the grilling temperature and the grilling time and real-time display the temperature inside the gas stove.

Optionally, the gas stove temperature-control system further includes:

a material-temperature sensor connected to the control/display panel and configured to detect temperature of grilled food which is displayed on the control/display panel.

In a second aspect, this application provides a gas stove with a gas stove temperature-control system adopting the following technical solution.

A gas stove with a gas stove temperature-control system included the gas stove temperature-control system, further including a stove body and a stove cover hinged on the stove body.

Optionally, an inner side wall of the stove body is provided with a protruded placing plate on which a grill is placed.

Optionally, a protruded supporting plate below the grill is disposed in the stove body, and a flame blocking plate is placed on the supporting plate.

Optionally, a side wall of the flame blocking plate opposite to the stove cover is recessed to form a plurality of limit grooves, and the supporting plate is provided with a plurality of protruded limit blocks abutting against groove walls of the limit grooves.

Optionally, a cabinet body is disposed below the stove body with an oil basin inserted therein, and a plurality of oil leakage holes extends through the flame blocking plate.

Optionally, an inner side wall of the cabinet body is provided with a protruded insertion plate on which an oil basin is placed.

Optionally, an insulation mesh above the grill is disposed in the stove body with a plurality of hanging holes extending through the insulation mesh at two ends, and insertion blocks for being insertion connection with the hanging holes is protruded from the inner side wall of the stove body.

In a third aspect, this application provides a method for controlling temperature of a gas stove adopting the following technical solution.

A method for controlling temperature of a gas stove includes the following steps:

acquiring a thermoelectric potential difference inside the gas stove after a stove cover is closed;

detecting whether the thermoelectric potential difference is lower than a preset target value;

if yes, stopping passing gas into the stove;

if no, detecting whether the stove is in a gas-in state;

if yes, indicating that there is flame in the stove; and if no, indicating that there is no flame in the stove and it is necessary to open the stove cover for re-ignition.

Optionally, the method includes the following steps when the stove cover is opened:

acquiring the thermoelectric potential difference inside the gas stove;

detecting whether the thermoelectric potential difference is lower than the preset target value;

if yes, setting grilling temperature and performing ignition while passing the gas into the stove;

if no, detecting whether the stove is in a gas-in state;

if yes, indicating that there is flame in the stove and keeping the gas-in state; and if no, indicating that the stove has just been closed and has not been cooled down.

Optionally, when the stove cover is opened and the thermoelectric potential difference is lower than the target value, after ignition and a preset time threshold, the thermoelectric potential difference inside the stove is re-acquired and it is checked whether it is lower than the target value;

if yes, stopping passing the gas into the stove and indicating that there is no flame in the stove; and if no, indicating that there is flame in the stove and controlling temperature of the interior the stove according to the set grilling temperature.

Optionally, after setting the grilling temperature and performing the ignition, when closing the stove cover and passing the gas into the stove, the method includes the following steps of:

detecting real-time temperature inside the stove and presetting a full-angle gas-in temperature threshold lower than the set grilling temperature according to the set grilling temperature;

determining whether the real-time temperature is lower than the full-angle gas-in temperature threshold;

if yes, passing the gas into the stove at a full-angle; and if no, reducing the angle at which the gas is supplied when the real-time temperature inside the stove is increased.

Optionally, the method further includes presetting a minimum gas-in angle according to which the gas is passed into the stove when the detected real-time temperature inside the gas stove is greater than or equal to the set grilling temperature.

In summary, this application provides the following beneficial effects. When the detected thermoelectric potential difference inside the gas stove is lower than the preset target value, the gas supply is stopped to reduce the possibility of explosion in the gas stove due to the increase of the ratio of the gas to the air when the temperature inside the gas stove does not reach the combustion temperature during the gas-in process, so as to improve the safety of the gas stove.

DESCRIPTION OF THE EMBODIMENTS

Embodiments of this application provide a gas stove temperature-control system.

Figure 1:
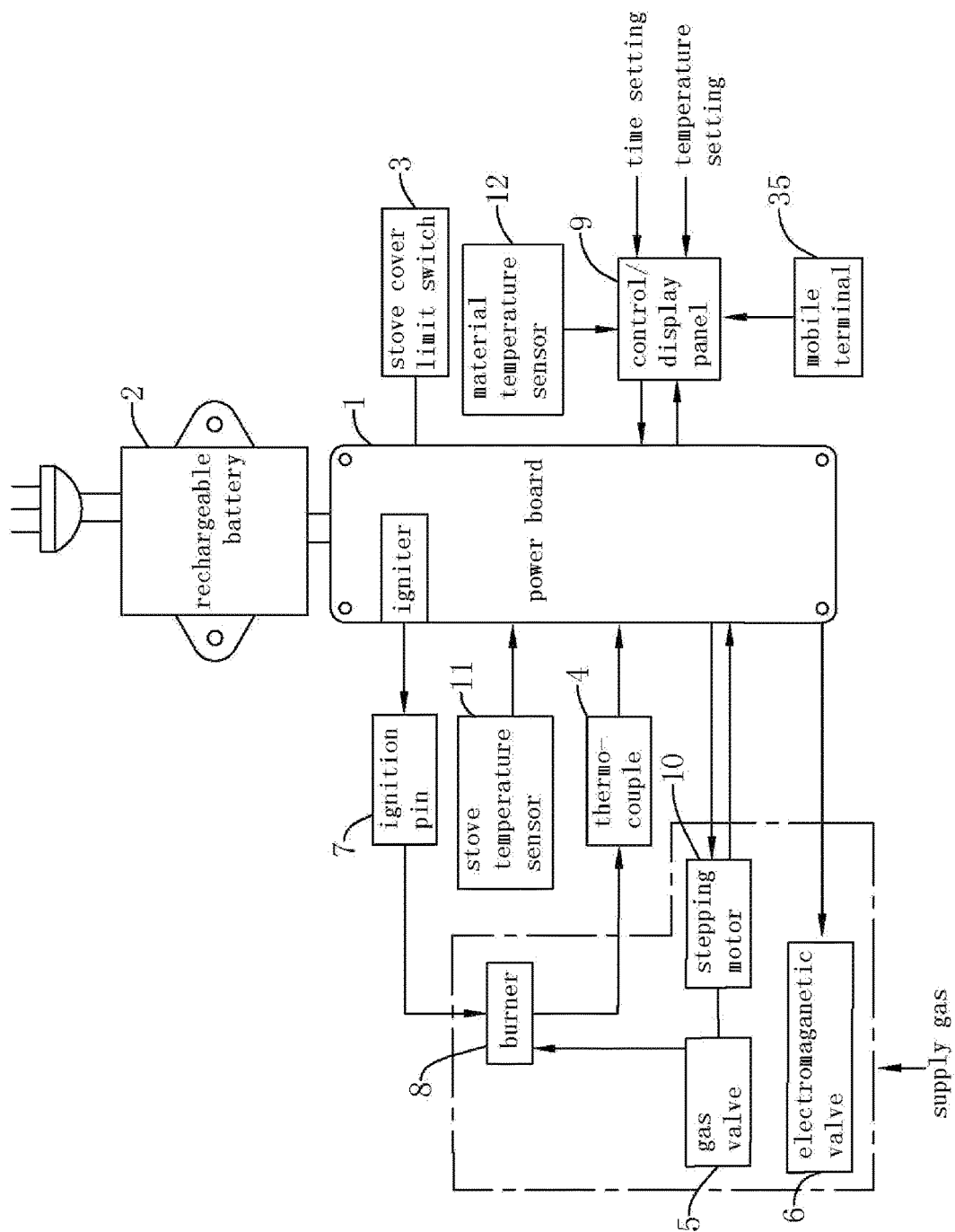
FIG. 1 is a structural schematic view of a gas stove temperature-control system according to one embodiment.

Referring to FIG. 1, the gas stove temperature-control system includes a power board 1, a rechargeable battery 2, a stove cover limit switch 3, a thermocouple 4, a gas valve 5, an electromagnetic valve 6, an ignition pin 7, a burner 8, a control/display panel 9, a stepping motor 10, a stove-temperature sensor 11 and a material-temperature sensor 12.

Referring to FIG. 1, the rechargeable battery 2 is connected to the power board 1 and supplies power to it, and the stove cover limit switch 3 is connected to the power board 1 and used to determine whether a stove cover is open or closed. The gas valve 5 is connected to the power board 1 and used to control on/off of the gas and adjust the flow rate thereof. The electromagnetic valve 6 is connected to the power board 1 and the gas valve 5 and used to control on/off of the gas valve 5. The ignition pin 7 is connected to the power board 1 and used for ignition in a stove. The burner 8 is connected to the gas valve 5 and the ignition pin 7, and ignited by the ignition pin 7 and burned using the gas input through the gas valve 5. The thermocouple 4 is connected to the power board 1 and used to detect whether the burner 8 is burning.

Referring to FIG. 1, the stepping motor 10 is connected to the gas valve 5 and the power board 1, and provided with a minimum preset gas-in angle. It is used to adjust an angle by which the gas valve 5 supplies gas to the stove so as to control the amount of the gas supplied into the stove. The control/display panel 9 is connected to the power board 1, and configured to set grilling temperature and grilling time. The control/display panel 9 is provided with a preset full-angle gas-in temperature threshold lower than the set grilling temperature and configured to real-time display change in temperature inside the stove and the angle at which the gas valve 5 supplies the gas to the stove. The control/display panel 9 is further provided with "+" and "−" keys for adjusting the stepping motor 10 so as to adjust the angle at which the gas valve 5 supplies the gas to the stove, with a maximum adjustment angle of a full angle, that is, 100% angle, and a minimum adjustment angle, that is, a minimum gas-in angle, of 10% angle, in which the amount of the supplied gas is decreased with the decrease of the adjustment angle. The control/display panel 9 further displays a heat power value of which a maximum value 100 corresponds to the full angle and a minimum value 10 corresponds to the minimum adjustment angle, with 10 degrees per grade. The stove-temperature sensor 11 is connected to the power board 1 and used to detect the temperature inside the gas stove which is displayed on the control/display panel 9.

The material-temperature sensor 12 is connected to the control/display panel 9 and used to detect the temperature of the grilled food which is displayed on the control/display panel 9. The mobile terminal 35 is connected to the control/display panel 9, and used to remotely set the grilling temperature and grilling time and real-time display the temperature inside the gas stove. In this embodiment, the mobile terminal 35 is preferably a mobile phone, a PC, an APP and so on, and the mobile terminal 35 and the control/display panel 9 are preferably connected by a Bluetooth, infrared ray or wireless network.

Referring to FIG. 1, when the stove cover limit switch 3 is turned on to close the stove cover 14, thermoelectric potential difference inside the gas stove is detected by the thermocouple 4. When the thermoelectric potential difference is lower than a preset target value which is preferably the temperature at which the burner 8 is ignited, indicating that the burner 8 is not ignited, the stepping motor 10 and the electromagnetic valve 6 are turned off, so that the gas is not passed into the gas valve 5. At this time, if a user touches an ignition button to ignite the burner 8 via the ignition pin 7, the control/display panel 9 will alternately display "OPEN" and "DOOR", and a buzzer in the control/display panel 9 will beep one time for warning, informing the user to open the stove cover 14 and perform ignition. If the thermoelectric potential difference is greater than or equal to the preset target value, indicating that the burner 8 is ignited, it is checked whether the electromagnetic valve 6 and the stepping motor 10 are energized. When the electromagnetic valve 6 and the stepping motor 10 are energized, the gas is passed into the gas valve 5, and at this time, if the user touches the ignition button to perform ignition, "OK" will be shown on a display screen, informing the user that the burner 8 is working and there is no need to perform ignition. When the electromagnetic valve 6 and the stepping motor 10 are turned off, the gas is not passed into the gas valve 5, indicating that the burner 8 has just been turned off and the thermocouple 4 has not been cooled down yet. At this time, if the user touches the ignition button to perform ignition, "OPEN" and "DOOR" will be shown on the display screen alternately, and the buzzer in the control/display panel 9 will beep one time for warning, informing the user to open the stove cover 14 for re-ignition.

Referring to FIG. 1, when the stove cover limit switch 3 is turned off to open the stove cover 14, the thermoelectric potential difference inside the stove is detected by the thermocouple 4. When the thermoelectric potential difference is lower than the preset target value, that is, the burner 8 is not ignited, the ignition pin 7 automatically perform ignition after the grilling temperature and the grilling time are set on the control/display panel 9. At this time, the electromagnetic valve 6 and the stepping motor 10 are immediately energized, and the gas is passed into the gas valve 5. During this process, if the thermoelectric potential difference detected by the thermocouple 4 does not reach the target value after 5 seconds, the electromagnetic valve 6 and the stepping motor 10 will be immediately de-energized and turned off, "NO" and "FIRE" will be shown on the display screen, and the buzzer in the control/display panel 9 will beep one time for warning, informing the user that the burner 8 is not ignited. If the thermoelectric potential difference detected by the thermocouple 4 is greater than or equal to the target value after 5 seconds, "OK" will be shown on the display screen, informing the user that the burner 8 is ignited. The gas stove will operate according to the set grilling temperature and grilling time.

Referring to FIG. 1, when the stove cover limit switch 3 is turned off to open the stove cover 14, the thermoelectric potential difference inside the stove is detected by the thermocouple 4. When the thermoelectric potential difference is lower than the preset target value, it is checked whether the electromagnetic valve 6 and the stepping motor 10 are energized. When the electromagnetic valve 6 and the stepping motor 10 are energized, indicating that the burner 8 is ignited, the gas stove allows the electromagnetic valve 6 and stepping motor 10 to keep the current state. If it needs to adjust the magnitude of the heat power, the user can directly press a temperature key on the control/display panel 9 to adjust the heat power, so that the stepping motor 10 controls the opening degree of the gas valve 5 so as to directly fix the degree according to the temperature. When the electromagnetic valve 6 and the stepping motor 10 are de-energized, it indicates that the burner 8 has just been turned off and the thermocouple 4 has not been cooled down yet.

In some embodiments, the stove cover 14 is opened to set the grilling temperature and grilling time and then closed to enable the gas stove to work, and the thermoelectric potential difference inside the stove is detected by the thermocouple 4. When the thermoelectric potential difference is greater than or equal to the preset target value and the burner 8 is working, the temperature inside the stove is detected by the stove-temperature sensor 11. When the temperature inside the stove is lower than the full-angle gas-in temperature threshold, the stepping motor 10 controls the gas valve 5 to supply the gas at a full angle; when the temperature inside the stove detected by the stove-temperature sensor 11 is greater than or equal to the full-angle gas-in temperature threshold and gradually increased, the stepping motor 10 controls the gas valve 5 to supply the gas at decreased angle; and when the temperature inside the stove detected by the stove-temperature sensor 11 is greater than or equal to the set grilling temperature, the stepping motor 10 controls the gas valve 5 to supply the gas at the minimum gas-in angle.

In some embodiments, the way by which the stepping motor controls the opening degree of the gas valve according to the change of the temperature inside the stove is as follows.

First, the actual stove temperature detected by the stove-temperature sensor 11 is set as Ts with a permissible minimum set value of 100° C. and a permissible maximum set value of 260° C.

When $Tp<Ts-70°$ C., the stepper motor supplies the gas at the full angle, in which $Ts-70°$ C. is the full-angle gas-in temperature threshold in some embodiments.

When $Ts-70°$ C.$\leq Tp<Ts-50°$ C., the stepping motor supplies the gas at an angle of 80%.

When $Ts-50°$ C.$\leq Tp<Ts-30°$ C., the stepping motor supplies the gas at an angle of 60%.

When $Ts-30°$ C.$\leq Ts-10°$ C., the stepping motor supplies the gas at an angle of 40%.

When $Ts-10°$ C.$\leq Tp<Ts$, the stepping motor supplies the gas at an angle of 20%.

When $Ts\leq Tp$, the stepping motor supplies the gas at the minimum gas-in angle of 10%.

This application further provides a gas stove with a gas stove temperature-control system.

Figure 2:
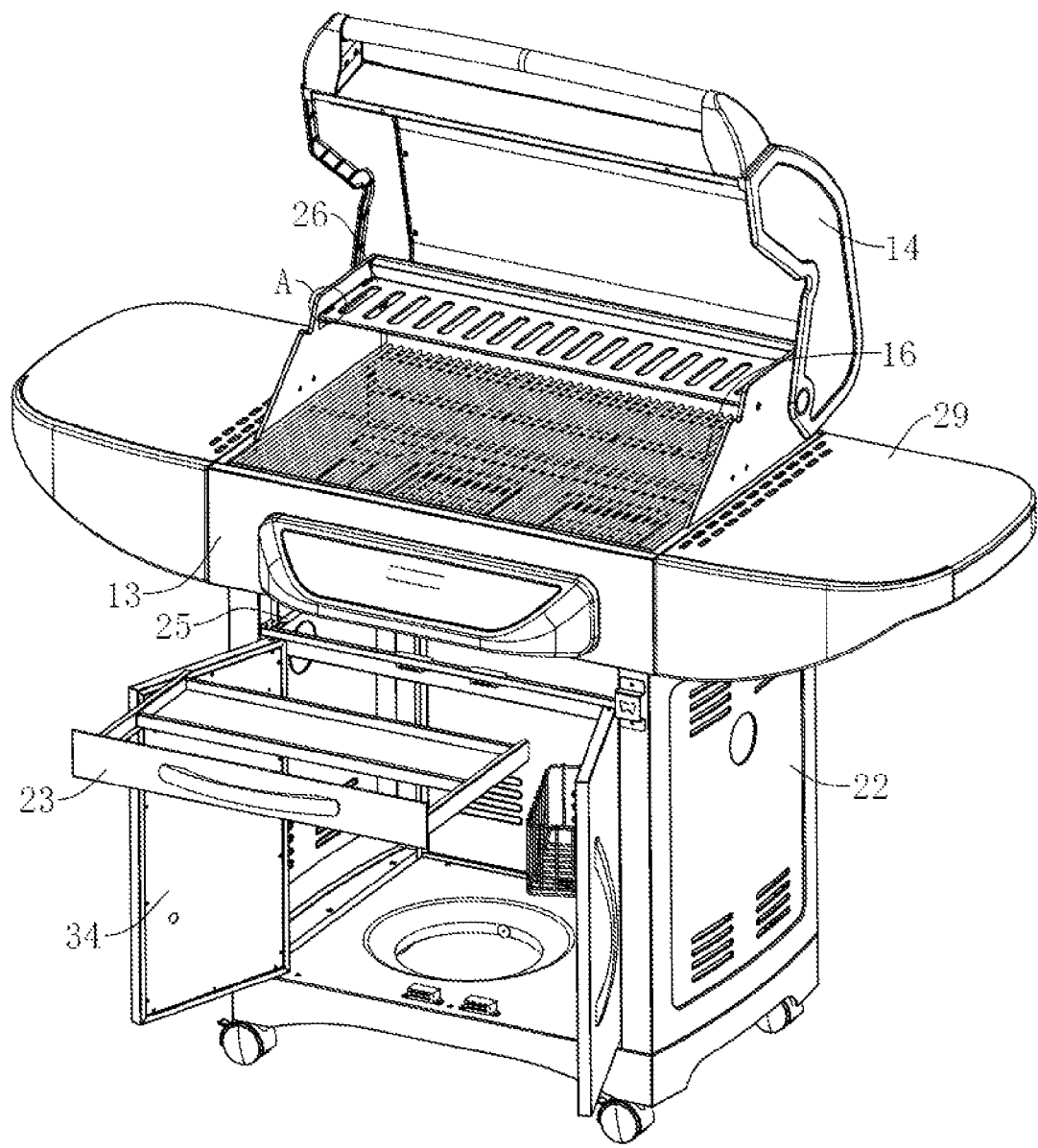
FIG. 2 is an overall structure view of a gas stove according to one embodiment.

Referring to FIG. 2, the gas stove with a gas stove temperature-control system includes a stove body 13, a stove cover 14 hinged on the stove body 13, and a gas stove temperature-control system provided in the stove body 13. Side platforms 29 are fixedly to the stove body 13 at two ends in the length direction, and a cabinet body 22 communicating with the stove body 13 is fixedly connected below the stove body 13. The cabinet body 22 is hinged with a cabinet door 34 and provided with insertion plates 25 protruded from two opposite side walls in the length direction of the stove body 13. An oil basin 23 movable along the insertion plates 25 is placed on the two insertion plates 25, so as to be put into or slid out of the cabinet body 22.

Figure 3:
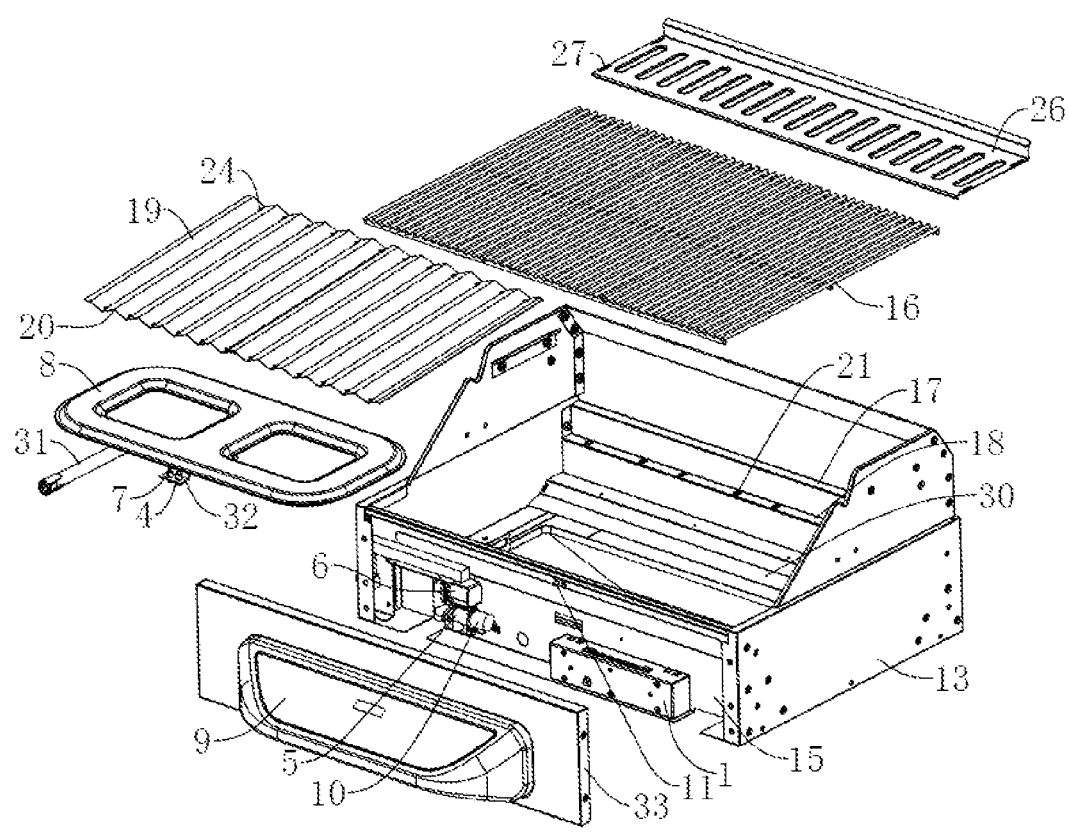
FIG. 3 is an overall structure view inside the gas stove according to one embodiment.

Referring to FIG. 3, in some embodiments, the gas stove temperature-control system is disposed in the stove body 13 as follows. A side wall of the stove body 13 has a mounting chamber 15 in the length direction. The power board 1 is fixedly connected to a chamber wall of the mounting chamber 15, the stepping motor 10 is fixedly connected to the chamber wall at the same side of the power board 1, the gas valve 5 is mounted on the stepping motor 10, the electromagnetic valve 6 is fixedly connected to the chamber wall above the gas valve 5, and the stove-temperature sensor 11 is fixedly connected to the chamber wall of the mounting chamber 15 above the power board 1.

Referring to FIG. 3, the burner 8 is disposed on the inner side wall of the stove body 13 opposite to the mounting chamber 15, and a protrusion plate 30 for placing the burner 8 is protruded from the side wall of the stove body 13 opposite to the mounting chamber 15. The burner 8 is fixedly connected with a gas pipe 31 at the bottom, with one end of the gas pipe 31 away from the protrusion plate 30 extending toward and through the mounting chamber 15. The gas valve 5 is connected to the burner 8 via the gas pipe 31, so as to pass the gas into the burner 8. One side of the burner 8 away from the protrusion plate 30 is fixedly connected with a connecting plate 32 at the bottom on which the ignition pin 7 and the thermocouple 4 are fixed.

Referring to FIG. 3, an outer side wall of the stove body 13 is further provided with a mounting plate 33 for closing the mounting chamber 15. The control/display panel 9 is fixedly connected to a side wall of the mounting plate 33 opposite to the stove body 13. The control/display panel 9 is configured to set the stove temperature and display the temperature inside the stove 13. The control/display panel 9 is further provided with "+" and "−" keys to adjust the stepping motor 10 so as to adjust the angle at which the gas valve 5 supplies the gas to the stove, with a maximum adjustment angle of a full angle, that is, 100% angle, and a minimum adjustment angle of 10% angle, in which the amount of the supplied gas is decreased with the decrease of the adjustment angle. The control/display panel 9 further displays a heat power value of which a maximum value 100 corresponds to a full angle and a minimum value 10 corresponds to a minimum adjustment angle, with 10 degrees per grade.

Referring to FIG. 3, a placing plate 17 above the burner 8 is protruded at two side walls of the stove body 13 in the length direction, on which a grill 16 for placing food is placed. The grill 16 is placed in the stove body 13 via the placing plate 17, for the convenience of replacement.

Referring to FIG. 3, a supporting plate 18 is protruded from the inner side wall of the stove body 13 between the grill 16 and the burner 8. There are two supporting plates 18 respectively disposed at two sides of the stove body 13 in the length direction. A flame blocking plate 19 is placed on the supporting plate 18. Since the burner 8 works to produce flames with large ones in some locations and small ones in other locations, the food on the grill 16 above the large flames will be easily burned while the food above the small flames will be grilled slowly. By disposing the flame blocking plate 19, heat generated by the flame of the burner 8 is transmitted first to the flame blocking plate 19, then to the entire flame blocking plate 19, and then to the entire grill 16 via the flame blocking plate 19, so that the food on the grill 16 can be heated evenly.

Referring to FIG. 3, a side wall of the flame blocking plate 19 facing the burner 8 is recessed to form a plurality of limit grooves 20 evenly arranged along the length direction of the flame blocking plate 19. Two ends of individual limit grooves 20 extend through two ends of the flame blocking plate 19 in the length direction, respectively. The supporting plate 18 is provided with a plurality of protruded limit blocks 21 abutting against the groove walls of the limit grooves 20 for limiting the movement of the flame blocking plate 19 on the supporting plate 18 and improving the placement stability of the flame blocking plate 19.

Referring to FIG. 3, a plurality of oil leakage holes 24 extend through two sides of the flame blocking plate 19 in the length direction. The plurality of oil leakage holes 24 are evenly disposed at the flame blocking plate 19 in the length direction on each side, and the width of the flame blocking plate 19 is greater than the width of the burner 8, so as to reduce the adhesion of oil on the burner 8 during the process where the oil generated from the food on the grill 16 drips through the oil leak hole 24 to the oil basin 23.

Figure 4:
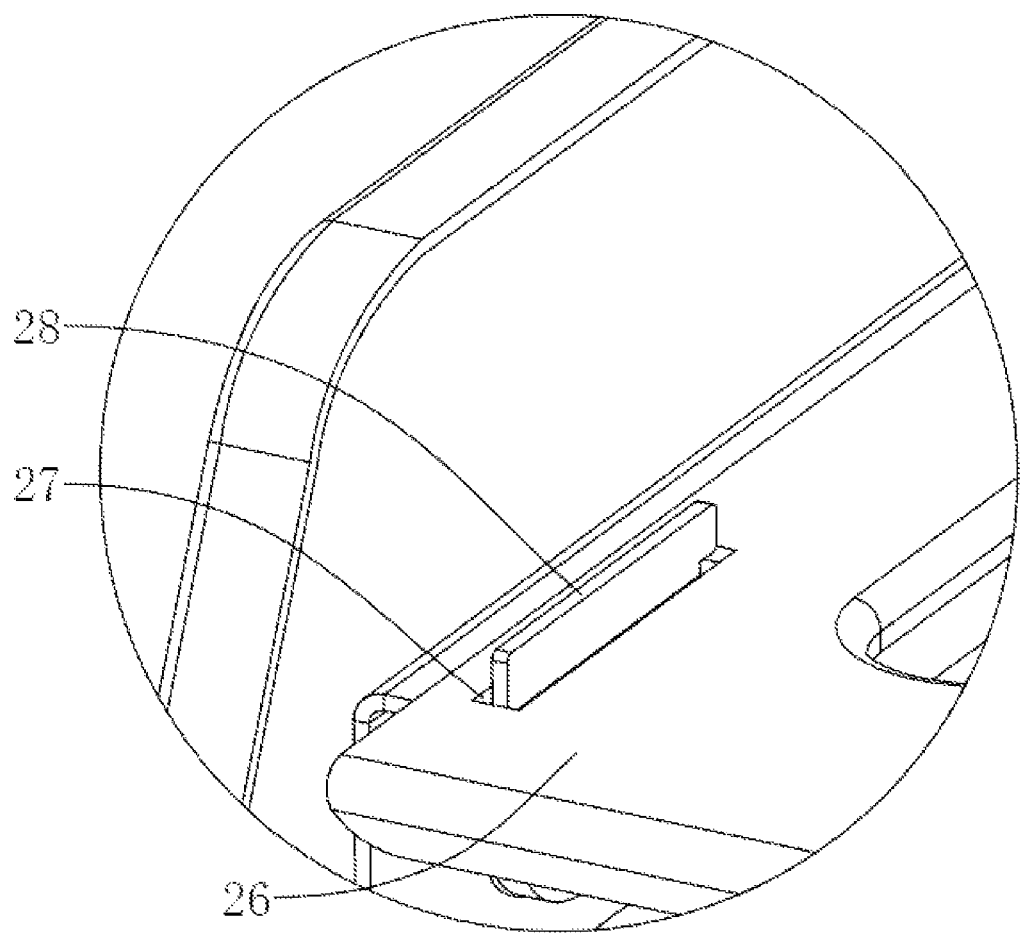
FIG. 4 is an enlarged view of part A in FIG. 2.

Referring to FIG. 2 and FIG. 4, an insulation mesh 26 above the grill 16 is disposed in the stove body 13 with a plurality of hanging holes 27 extending through the insulation mesh 26 in the length direction at two ends, and an insertion blocks 28 for being insertion connected with the hanging holes 27 are protruded from the inner side wall of the stove body 13. The providing of the insulation mesh 26 reduces heat loss after the gas stove stops working and keeps the temperature of the food remained on the grill 16.

In some embodiments, when the gas stove is used for grilling, the cabinet door 34 and the stove cover 14 are opened, the oil basin 23 is slid into the cabinet body 22 along the insertion plate 25, and the flame blocking plate 19 is placed on the supporting plate 18 with the groove walls of the limit grooves 20 abutting against the limit blocks 21. The grill 16 is then placed on the placing plate 17 and the food is placed on the grill 16. Hanging holes 27 on the insulation mesh 26 is aligned with and inserted in the insertion blocks 28 so that the insulation mesh 26 is fixed in the stove body 13. Finally, the grilling temperature is set by the control/display panel 9, the burner 8 is ignited by turning on the ignition pin 7, the electromagnetic valve 6 and the gas valve 5, and the cabinet door 34 and the stove cover 14 are closed for grilling.

This application further provides a method for controlling temperature of a gas stove.

Figure 5:
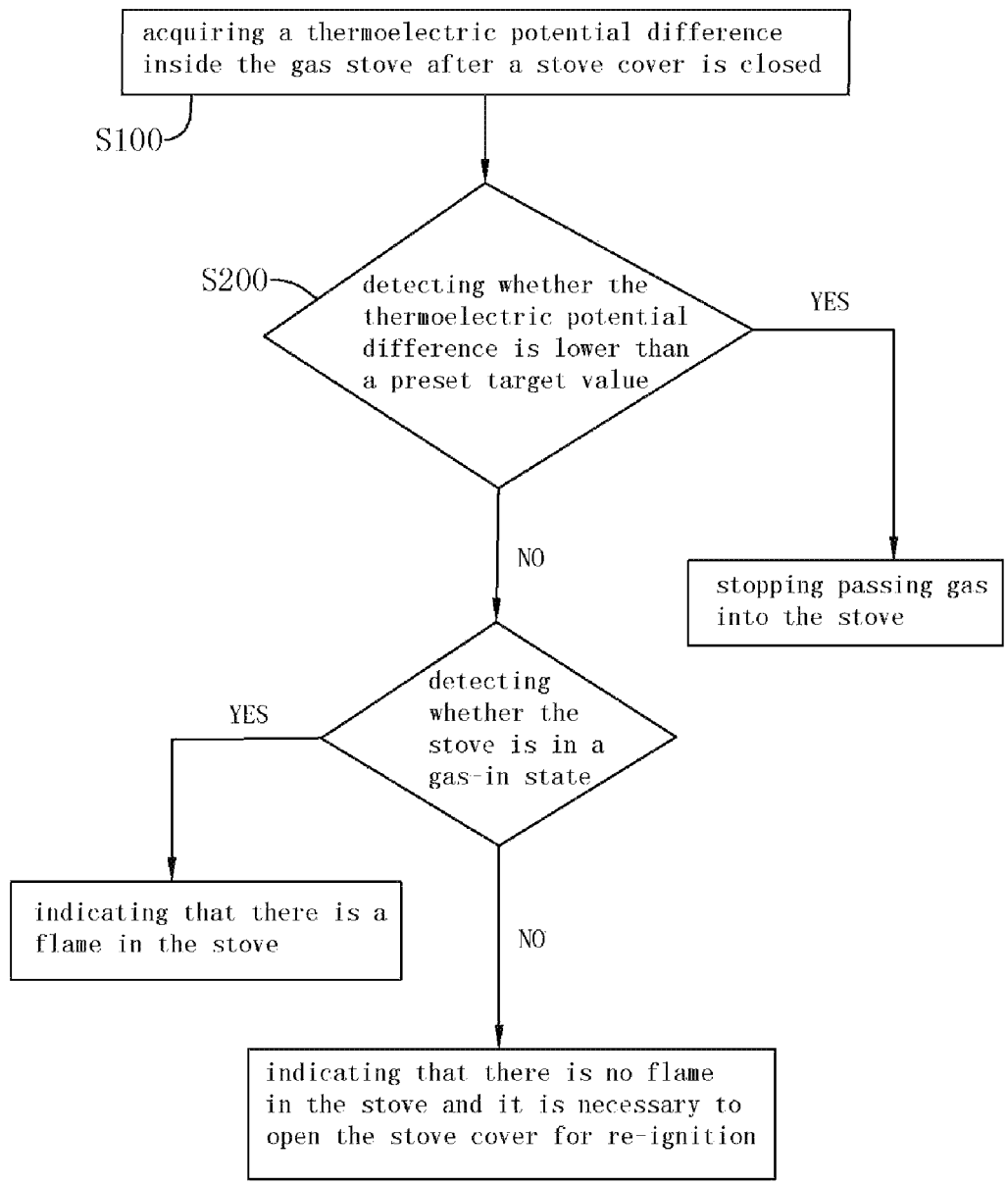
FIG. 5 is a first block diagram of a gas stove temperature-control method according to another embodiment.

Referring to FIG. 5, the method for controlling the temperature of the gas stove includes the following steps:

S100, acquiring a thermoelectric potential difference inside the gas stove after a stove cover is closed; and S200, detecting whether the thermoelectric potential difference is lower than a preset target value.

In some embodiments, after the stove cover is closed, the thermoelectric potential difference, in particular, the temperature inside the gas stove is acquired, and the acquired temperature is compared with a preset temperature threshold, that is, a target value in this embodiment.

If the acquired temperature is lower than the target value, stopping passing the gas into the stove.

In some embodiments, when the detected thermoelectric potential difference is lower than the target value, indicating that there is no flame in the stove, the gas supply is stopped to reduce the possibility of explosion in the gas stove due to the increase of the ratio of the gas to the air when the temperature inside the gas stove does not reach the combustion temperature during the gas-in process, so as to improve the safety of the gas stove. If a user wants to touch an ignition button for ignition, a buzzer in the gas stove will beep to inform the user to open the stove cover for re-ignition, so as to dissipate the gas in the gas stove.

If the acquired temperature is greater than or equal to the target value, it is detected whether the stove is in a gas-in state.

In some embodiments, when the detected thermoelectric potential difference is greater than or equal to the target value, indicating that there is flame in the gas stove and the gas is burning, it is necessary to detect the state of the gas in the gas stove to determine whether the gas stove is in the gas-in state or not.

If yes, indicating that there is flame in the stove.

In some embodiments, when the gas stove is in the gas-in state, it indicates that there is flame in the gas stove, and it is only necessary to keep passing the gas into the gas stove all the time. If the user wants to touch the ignition button for ignition, the user will be informed that there is flame in the gas stove, and there is no need to perform re-ignition.

If no, informing the user that there is no flame in the stove and it is necessary to open the stove cover for re-ignition.

In some embodiments, when the gas stove is not in a gas-in state, it indicates that the burner has just been turned off and the gas stove has not been cooled down. If the user wants to touch the ignition button for ignition, the buzzer in the gas stove will beep to inform the user to open the stove cover for re-ignition.

Referring to FIG. 5, further, after the gas stove is opened, the method includes the following steps:

S300, acquiring the thermoelectric potential difference inside the stove; and

S400, detecting whether the thermoelectric potential difference is lower than the preset target value.

In some embodiments, after the stove cover is opened, the thermoelectric potential difference inside the gas stove is acquired and compared with the target value which is preferably the temperature at which the gas is ignited.

If yes, setting grilling temperature and performing ignition, while passing the gas into the stove.

In some embodiments, when the detected thermoelectric potential difference is lower than the target value, indicating that there is no flame in the stove, the grilling time can be set on the gas stove, after which the gas will be automatically ignited, and the gas needed will be passed into the gas stove to keep a burning state in the gas stove.

If no, detecting whether the stove is in the gas-in state.

In some embodiments, when the detected thermoelectric potential difference is greater than or equal to the target value, indicating that there is flame in the gas stove, it is necessary to detect the state of the gas in the gas stove to determine whether the gas stove is in the gas-in state or not.

If yes, indicating that there is flame in the stove and keeping the gas-in state.

In some embodiments, when the gas stove is in the gas-in state, it indicates that there is flame in the gas stove, and it is only necessary to keep passing the gas into the gas stove all the time and keep the gas stove at the set grilling temperature.

If no, informing the user that the burner in the stove has just been turned off and the stove has not been cooled down.

In some embodiments, when the gas stove is not in the gas-in state, it indicates that the burner has just been turned off and the gas stove has not been cooled down.

Referring to FIG. 5, further, when the stove cover is open and the detected thermoelectric potential difference is lower than the target value, after ignition and a preset time threshold, the thermoelectric potential difference inside the stove is re-acquired and it is checked to determine whether it is lower than the target value.

In some embodiments, when the stove cover is open and the detected thermoelectric potential difference is lower than the target value, after a preset time threshold, preferably 5 seconds in this embodiment, from setting the grilling temperature and igniting the burner lapses, the thermoelectric potential difference inside the stove is re-acquired and compared with the preset target value.

If the acquired thermoelectric potential difference is lower than the preset target value, stopping passing the gas into the stove and informing the user that there is no flame in the stove.

In some embodiments, when the re-detected thermoelectric potential difference is lower than the target value, indicating that there is no flame in the stove, the user is informed that there is no flame in the gas stove and it is necessary to stop passing the gas into the gas stove.

If the acquired thermoelectric potential difference is greater than or equal to the preset target value, informing the user that there is flame in the stove and controlling temperature inside the stove according to the set grilling temperature.

In some embodiments, when the re-detected thermoelectric potential difference is greater than or equal to the target value, indicating that there is flame in the stove, the user is informed that there is flame in the gas stove and the gas stove keeps working according the set grilling temperature.

It should be noted that after the grilling temperature is set and the burner is ignited, the thermoelectric potential difference inside the gas stove is detected every 5 seconds. Once the detected thermoelectric potential difference is lower than the target value, the user is informed that there is no flame in the gas stove and it is necessary to stop passing the gas into the gas stove.

Figure 6:
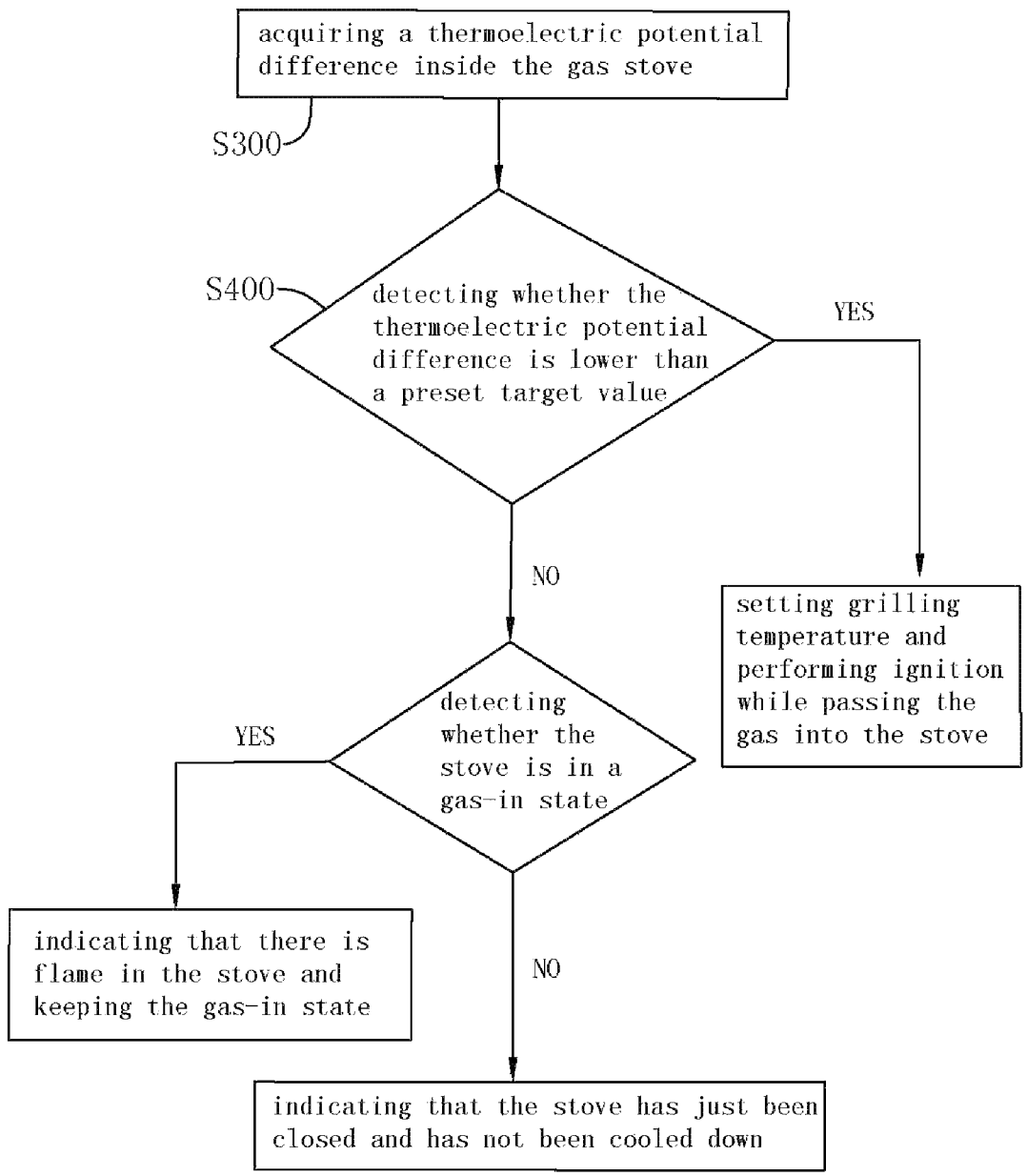
FIG. 6 is a second block diagram of the gas stove temperature-control method according to another embodiment.

Referring to FIG. 5 and FIG. 6, after setting the grilling temperature and performing the ignition, when closing the stove cover and passing the gas into the stove, the method includes the following step of:

detecting real-time temperature inside the stove and presetting a full-angle gas-in temperature threshold lower than the set grilling temperature according to the set grilling temperature.

In some embodiments, the temperature inside the gas stove is detected when the gas stove is working. After the stove cover is opened and the grilling temperature is preset, the full-angle gas-in temperature threshold is determined according to the preset grilling temperature. In this embodiment, preferably, the full-angle gas-in is that when the gas valve 5 is completely opened.

Determining whether the real-time temperature is lower than the full-angle gas-in temperature threshold.

In some embodiments, the temperature detected when the gas stove is working is compared with the full-angle gas-in temperature threshold. In this embodiment, the full-angle gas-in temperature threshold is lower than the preset grilling temperature.

If yes, passing the gas into the stove at a full angle.

In some embodiments, when the detected temperature during the working of the gas stove is lower than the full-angle gas-in temperature threshold, it means that more gas is required to be passed into the gas stove, therefore, the gas is supplied at the full angle.

If no, reducing the angle at which the gas is supplied when the real-time temperature inside the stove is gradually increased.

In some embodiments, when the detected temperature during the working of the gas stove is greater than or equal to the full-angle gas-in temperature threshold, it means that the gas passed into the gas stove has met the needs of combustion, therefore, the angle at which the gas is supplied is reduced to reduce the amount of the gas passed in when the temperature inside the gas stove is increased.

Further, with the raising of the temperature inside the gas stove, the angle at which the gas is supplied will decrease, while since it is necessary to maintain the combustion state inside the gas stove, it is necessary to keep passing the gas into the gas stove. Therefore, in this application, a preset minimum gas-in angle is provided, and the gas is passed into the stove according to the preset minimum gas-in angle when the detected real-time temperature inside the gas stove is greater than or equal to the set grilling temperature.

What is claimed is:

1. A method for controlling temperature of a gas stove comprising the following steps of:
    acquiring thermoelectric potential difference inside the gas stove after a stove cover is closed;
    detecting whether the thermoelectric potential difference is lower than a preset target value;
    if yes, stopping passing gas into the gas stove;
    if no, detecting whether the gas stove is in a gas-in state;
    if yes, indicating that there is flame in the gas stove; and
    if no, indicating that there is no flame in the gas stove and it is necessary to open the stove cover for re-ignition.

2. The method according to claim 1, comprising the following steps when the stove cover is open:
    acquiring a thermoelectric potential difference inside the gas stove;
    detecting whether the thermoelectric potential difference is lower than the preset target value;
    if yes, setting grilling temperature and performing ignition while passing the gas into the gas stove;
    if no, detecting whether the gas stove is in a gas-in state;
    if yes, indicating that there is flame in the gas stove and keeping the gas-in state; and
    if no, indicating that the gas stove has just been closed and has not been cooled down.

3. The method according to claim 2, wherein when the stove cover is opened and the thermoelectric potential difference is lower than the target value, after ignition and a preset time threshold, the thermoelectric potential difference inside the gas stove is re-acquired and it is checked whether it is lower than the target value;
    if yes, stopping passing the gas into the gas stove and indicating that there is no flame in the gas stove; and
    if no, indicating that there is flame in the gas stove and controlling temperature of the interior the gas stove according to the set grilling temperature.

4. The method according to claim 2, wherein after setting the grilling temperature and providing the ignition, when closing the stove cover and passing the gas into the gas stove, the method comprises the following steps of:
    detecting real-time temperature inside the gas stove and presetting a full-angle gas-in temperature threshold lower than the set grilling temperature according to the set grilling temperature;
    determining whether the real-time temperature is lower than the full-angle gas-in temperature threshold;
    if yes, passing the gas into the gas stove at a full-angle; and
    if no, reducing the angle at which the gas is supplied when the real-time temperature inside the gas stove is increased.

5. The method according to claim 4, further includes presetting a minimum gas-in angle according to which the gas is passed into the gas stove when the detected real-time temperature inside the gas stove is greater than or equal to the set grilling temperature.

* * * * *